June 29, 1937.  L. DESBORDES ET AL  2,085,575
TRANSPORTING AND GUIDING MEANS
Filed Nov. 28, 1934    2 Sheets-Sheet 2
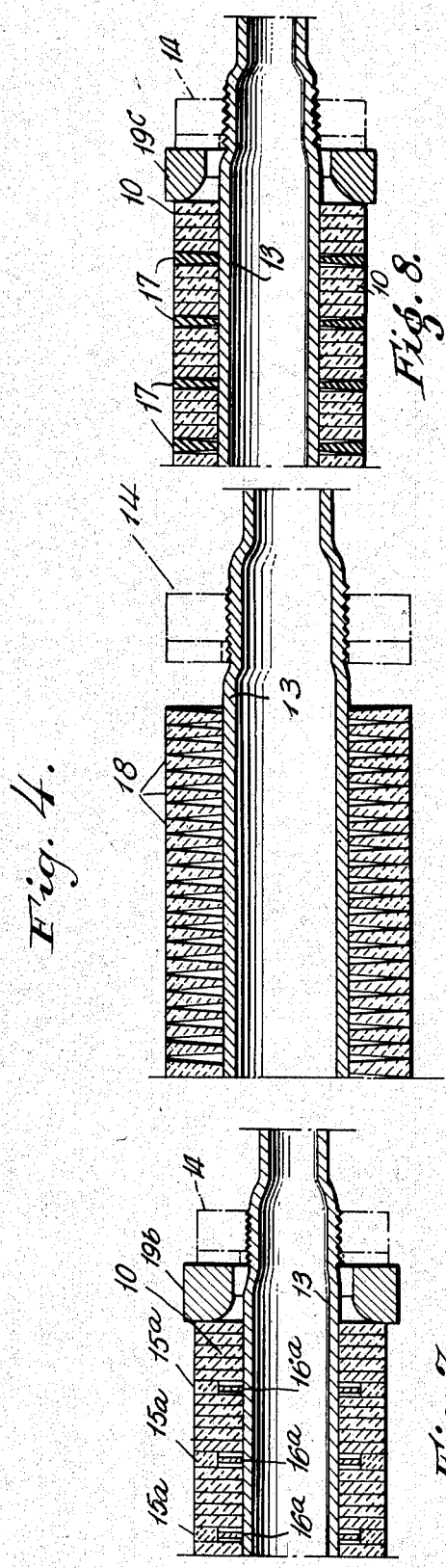
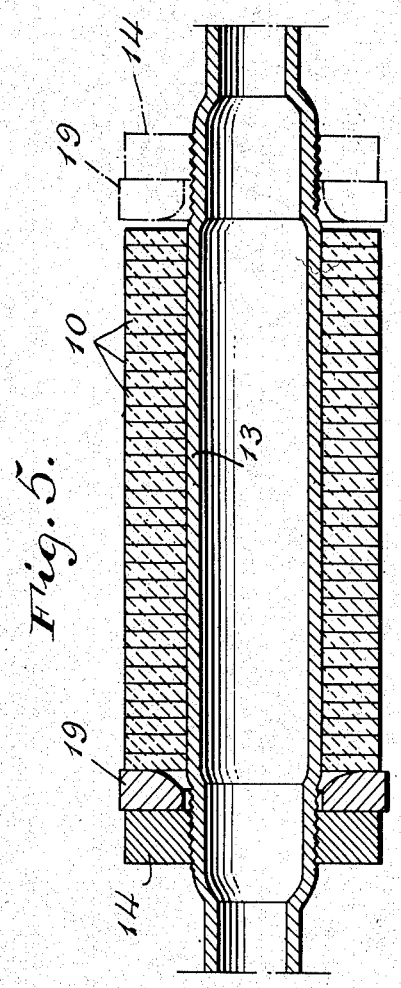
INVENTORS
LOUIS DESBORDES
PIERRE BERTRAND
BY
ATTORNEYS Patented June 29, 1937

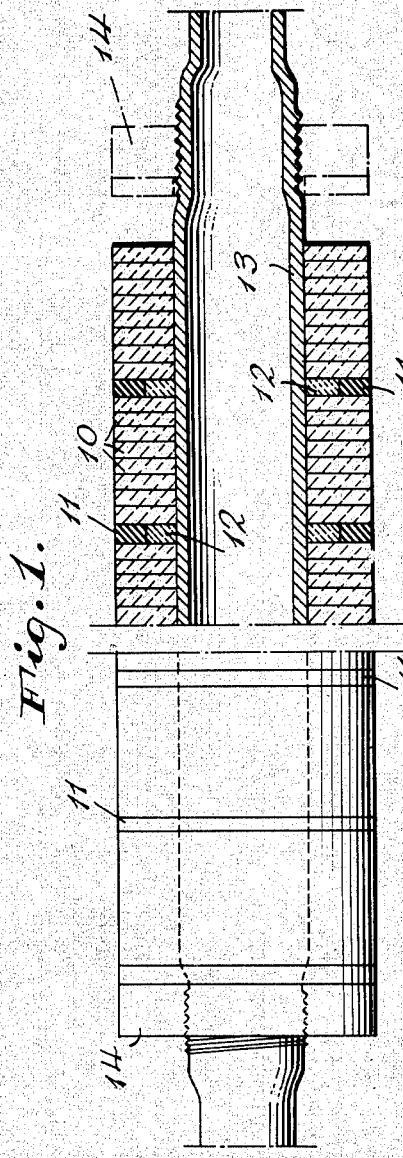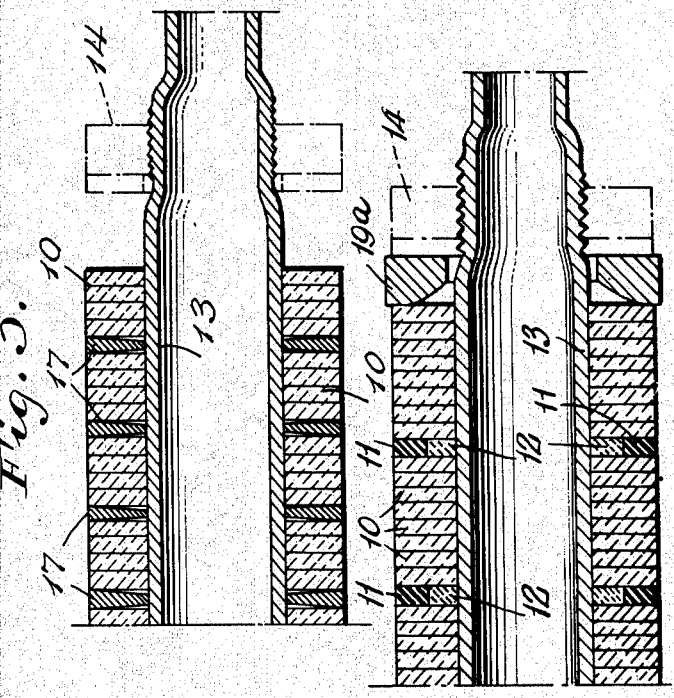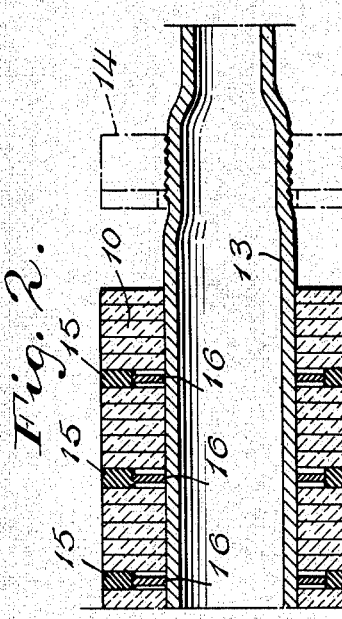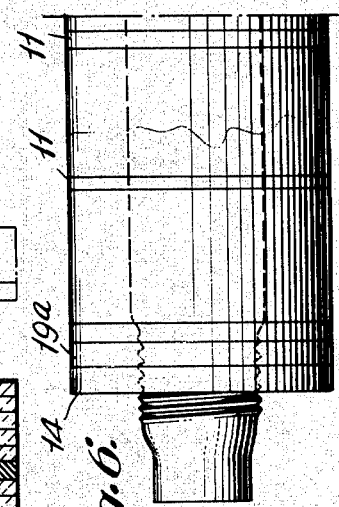

2,085,575

UNITED STATES PATENT OFFICE 2,085,575

TRANSPORTING AND GUIDING MEANS

Louis Desbordes, Machemont, and Pierre Bertrand, Paris, France, assignors to Societe Anonyme des Manufactures des Glaces & Produits Chimiques de Saint-Gobain, Chauny & Cirey, Paris, France Application November 28, 1934, Serial No. 755,098
In France December 1, 1933

15 Claims. (Cl. 49—14)

This invention relates to transporting and guiding means and refers more particularly to rollers used for the transportation, guiding and/or drawing of hot articles, such as sheets of glass immediately after these sheets were drawn, rolled or flattened by any of the generally used methods.

Rollers used for the transportation of hot sheets of glass comprise usually a metallic tube or rod which forms the axle of the roller and which carries a number of discs made of asbestos. These discs are tightly packed upon the rod or tube and are used for the purpose of preventing a direct contact between the hot glass and the metallic axle.

Experience has shown that such rollers wear out rather quickly and irregularly after they have been in use for some time, whereby the outer cylindrical surfaces of the asbestos discs lose their original form. Since the sheets of glass which are transported by the rollers are often soft or not completely solidified, the irregular shape of these discs may cause the formation of grooves, ridges or other impressions upon the surfaces of the glass sheets.

An object of the present invention is the provision of rollers which may be subjected to intensive use for a considerable period of time without losing their shape and without affecting in any way the form of the articles transported by these rollers.

The above and other objects of this invention may be realized through the provision of a roller comprising a central support or axle carrying discs of asbestos or of other heat-insulating material, which are more strongly tightened at their outer surface or periphery than in their part close to the axle or central support.

As is known in the art, asbestos is a compressible material having a resistance to mechanical stresses which increases with an increase in compression. In the roller of the known type, we have found by experiments that the pressure exerted on the asbestos discs at the end or ends of the roller in order to have the asbestos discs tightened together, is not regularly transmitted to the whole line of discs. On the one hand, at the periphery the discs may not be sufficiently pressed though the total pressure exerted at the end of the roller has a great value. On the other hand, the central part of each disc, under the action of the tightening pressure applied to it, tends to expand and to be pressed against the central support or axle; during the course of the tightening in manufacturing the roller, a friction occurs between the disc and the support or axle, which prevents the complete transmission of the tightening pressure resulting in an uneven distribution of the compression of the asbestos along the whole length of the roller and consequently in an uneven resistance to wear.

In the rollers manufactured according to the present invention, the outer surface which has to resist to the wear, receives the greater part of the tightening pressure exerted on the end or ends of the roller; moreover, the frictions upon the axle of the roller, which may alter the transmission of the entire tightening pressure, are, if not entirely avoided, lessened for their greatest part.

The invention will appear more clearly from the following detailed description when taken in connection with the accompanying drawings showing different embodiments of the inventive idea, before the heat-insulating discs are compressed.

In the drawings:

Figure 1 is partly a side view of and partly a longitudinal section through a roller constructed in accordance with the principles of the present invention.

Figure 2 shows in longitudinal section a part of another roller constructed in accordance with the principles of the present invention.

Figure 3 shows in longitudinal section a part of a third type of roller according to the present invention.

Fig. 4 is also a longitudinal section of a part of a fourth type of roller according to the present invention.

Fig. 5 shows in longitudinal section a roller of a somewhat different construction.

Figures 6, 7, and 8 illustrate rollers of different constructions, these figures being views similar to those shown in Figs. 1, 2, and 3, respectively.

In the roller shown in Figure 1 of the drawings the asbestos discs 10 are of the ordinary known type and other discs or collars 11 are placed at predetermined intervals between the discs 10. The discs 11 have the same outer diameter as the asbestos discs 10 but have a greater inner diameter. Other discs 12 having an outer diameter which is equal to the inner diameter of the discs 11 are placed within these discs in the space comprised between the discs 11 and the central support or axle 13; the discs 12 have, before being compressed, the same thickness as the surrounding discs 11, but discs 11 and 12 are made of different substances, the outer discs 11 being of a less compressible material than the inner discs 12. With the roller thus realized, when the tightening pressure is applied at the ends of the roller, for example, by means of nuts 14, each disc 12 being more compressible than the surrounding disc 11, yields and consequently the greater part of the pressure is applied on the corresponding discs 11. If one uses a sufficient number of the elements comprising an outer disc 11 and an inner disc 12, it may be possible to have all the asbestos discs 10 much less compressed at their central part close to the axle 13 than at their outer part, so that the resistance of asbestos material is maximum at the periphery of the roller which is submitted to wear; moreover the asbestos discs being less compressed close to the axle do not rub upon this axle and consequently the tightening pressure is entirely transmitted on the whole length of the roller.

For the realization of the roller described hereinabove the discs 11 may be of metal or hard refractory material and the discs 12 may be of asbestos, said asbestos discs 12 having not only the property of being more compressible than metallic discs 11 but also of being used as heat insulating material interposed between the metallic discs 11 and the axle 13. Moreover such metallic discs 11 have the advantage of insuring a regular transmission of the pressures between the asbestos discs which are adjacent to them. The local variations of pressure transmitted to the metallic disc due to the irregularities in the texture of the adjacent asbestos disc are on account of the rigidity of the metal, distributed on a greater surface of the metallic disc and are thus transmitted much lessened to the next asbestos disc.

In the roller shown in Figure 2, the ordinary discs 10 have a uniform thickness as in the roller of Figure 1. Elements composed of two concentric discs 15 and 16 are interposed between said ordinary asbestos discs 10 at predetermined distances from each other. Both concentric discs 15 and 16 are made of the same material and have different thicknesses, that of the outer one 15 being greater than that of the inner one 16. The action of the element constituted by the two concentric discs 15 and 16 is the same as that of the element shown in Figure 1 in such a manner that the greater part of the pressure is supported by the outer part of the asbestos discs.

According to the present invention, it is evident that in order to have the same result, the inner disc 12 or 16 may be wholly suppressed.

It is also possible, instead of interposing elements composed of two concentric discs, to interpose elements constituted by three, four ... concentric discs, the thickness of these discs decreasing from the periphery of the roller to the axle.

In the roller shown in Figure 3 the interposed discs 17 have the same outer diameter and inner diameter as the ordinary asbestos discs 10, but their thickness is decreased from the periphery of the roller toward the axle.

In the different forms of realization hereinabove described, the material constituting the interposed discs may vary according to the nature of the articles to be displaced in contact with the rollers; thus it may be of interest for example in the manufacture of window glass by drawing a sheet from a bath of molten glass, to provide rollers having their outer surface made entirely of asbestos. Thus the discs 11, 15 and 17 would be made of asbestos as the discs 10. In case inner discs 12 of same thickness as the surrounding discs 11 are to be used said discs would be made of a material more compressible than asbestos.

In Figure 4 the discs 18 are all of the same type, their thickness decreasing from the periphery toward the axle in a continuous manner or by steps.

In Figure 5, the asbestos discs 10 are all of the ordinary known type, with a uniform thickness, but the tightening members 19 placed at both ends of the rollers have such a shape that the distance between both members is smaller at the periphery than close to the center of the roller in order that the pressure exerted on the asbestos discs be greater at the periphery than in the neighbourhood of the axle. These tightening members 19 may also be applied with rollers constituted as shown in Figures 1 to 4.

The word "asbestos" has always been used hereinabove to designate the material constituting a certain number of the discs, but the present invention refers also to rollers constituted by discs or collars of heat-insulating material similar to asbestos. The word "axle" used to designate the support of the discs may be applied to all the means carrying the discs and used as armatures for their tightening.

Figure 6 of the drawings is similar to Figure 1, the same parts being designated by the same numerals. The discs 10, 11 and 12 of the roller shown in Fig. 6 are compressed by tightening members 19a which are similar in form to those shown in Fig. 5.

Figure 7 shows concentric discs 15a and 16a which are made of the same material as the discs 10 and which are compressed by a tightening member 19b similar in form to those shown in Fig. 5.

Figure 8 illustrates the use of tightening members 19c in connection with the construction shown in Fig. 3 of the drawings.

What is claimed is:

1. A method for the manufacture of a roller constituted by a support and a plurality of discs made of a compressible heat-resisting material, carried by said support, which comprises placing the discs upon the support and then compressing the outer part of the discs more than their central part.

2. A method for the manufacture of a roller constituted by a support and a plurality of discs made of a compressible heat-resisting material carried by said support, which comprises placing the discs upon the support and interposing other discs between the first-mentioned discs of such material, shape and dimensions that, when the discs are put under compression, the outer part of the first-mentioned discs is more compressed than their central part, and then compressing all of said discs.

3. A method for the manufacture of a roller constituted by a support and a plurality of discs made of a compressible heat resisting material carried by said support, which comprises placing said discs upon the support and interposing other discs of the same material between the first-mentioned discs and of such dimensions and shape that, when the discs are put under compression, the outer part of the discs is more compressed than their central part, and then compressing all of said discs.

4. A method for the manufacture of a roller constituted by a support and a plurality of discs made of a compressible heat-resisting material carried by said support, which comprises placing said discs upon the support and interposing discs of a less compressible material and of such shape and dimensions that, when the discs are put under compression, the outer part of the discs is more compressed than their central part, and then compressing all of said discs.

5. A method for the manufacture of a roller constituted by a support and a plurality of discs made of a compressible heat-resisting material carried by said support, which comprises placing said discs upon the support and interposing discs having a decreasing thickness from their periphery to the axle in such a manner that, when the discs are put under compression, the outer part of the discs is more compressed than their central part, and then compressing all of said discs.

6. A roller comprising a support, a plurality of ordinary discs made of a compressible heat-resisting material and having a uniform thickness, carried by said support, elements comprising two concentric discs interposed between said ordinary discs, both discs of such elements having the same thickness, the outer one being less compressible than the inner one and having the same outer diameter as the ordinary discs, the other having an outer diameter equal to the inner diameter of the outer disc, and means for compressing the discs.

7. A roller comprising a support, a plurality of ordinary discs made of a compressible heat-resisting material and having a uniform thickness carried by said support, elements comprising two concentric discs interposed between said ordinary discs, both discs of such elements having the same thickness, the outer one being a metallic disc which has the same outer diameter as the ordinary discs, the other being a heat-resisting disc which is more compressible than said outer metallic disc and which has its outer diameter equal to the inner diameter of the metallic disc, and means for compressing the discs.

8. A roller comprising a support, a plurality of ordinary discs made of a compressible heat-resisting material and having a uniform thickness carried by said support, other discs interposed between the first-mentioned discs and having the same outer diameter as said discs but having a greater inner diameter, and means for compressing the discs.

9. A roller comprising a support, a plurality of ordinary discs made of a compressible heat-resisting material and having a uniform thickness carried by said support, elements comprising two concentric discs made of the same material, the outer one having the same diameter as ordinary discs and the other having its outer diameter equal to the inner diameter of the surrounding disc, the thickness of the outer one being greater than that of the inner one, and means for compressing the discs.

10. A roller comprising a support, a plurality of ordinary discs made of a compressible heat-resisting material and having a uniform thickness carried by said support, elements comprising a plurality of concentric discs made of the same material interposed between the first-mentioned discs, the outer one having the same diameter as the first-mentioned discs and the thickness of said concentric discs decreasing from the outer one to the inner one, and means for compressing the discs.

11. A roller comprising a support, a plurality of ordinary discs made of a compressible heat-resisting material and having a uniform thickness carried by said support, discs interposed between the first-mentioned discs having the same outer and inner diameters as the first-mentioned discs but having a thickness which decreases from the periphery toward the center, and means for compressing the discs.

12. A roller comprising a support, a plurality of ordinary discs made of a compressible heat-resisting material and having a uniform thickness, carried by said support, elements comprising two concentric discs interposed between said ordinary discs, both discs of such elements having the same thickness, the outer one being less compressible than the inner one and having the same outer diameter as the ordinary discs, the other having an outer diameter equal to the inner diameter of the outer disc, and tightening members at both ends of the roller having such a shape as to produce a greater pressure on the periphery than on the inner part of the discs.

13. A roller comprising a support, a plurality of ordinary discs made of a compressible heat resisting material and having a uniform thickness carried by said support, elements comprising two concentric discs made of the same material, the outer one having the same diameter as ordinary discs and the other having its outer diameter equal to the inner diameter of the surrounding disc, the thickness of the outer one being greater than that of the inner one, and tightening members at both ends of the roller having such a shape as to produce a greater pressure on the periphery than on the inner part of the discs.

14. A roller comprising a support, a plurality of ordinary discs made of a compressible heat-resisting material and having a uniform thickness carried by said support, elements comprising a plurality of concentric discs made of the same material interposed between the first-mentioned discs, the outer one having the same diameter as the first-mentioned discs and the thickness of said discs decreasing from the outer one to the inner one, and tightening members at both ends of the roller having such a shape as to produce a greater pressure on the periphery than on the inner part of the discs.

15. A roller comprising a support, a plurality of ordinary discs made of a compressible heat-resisting material and having a uniform thickness carried by said support, discs interposed between the first-mentioned discs having the same outer and inner diameters as the first-mentioned discs but having a thickness which decreases from the periphery toward the center, and tightening members at both ends of the roller having such a shape as to produce a greater pressure on the periphery than on the inner part of the discs.

LOUIS DESBORDES.
PIERRE BERTRAND.